United States Patent
Steensgaard et al.

(10) Patent No.: US 7,263,532 B2
(45) Date of Patent: Aug. 28, 2007

(54) REGION-BASED MEMORY MANAGEMENT FOR OBJECT-ORIENTED PROGRAMS

(75) Inventors: Bjarne Steensgaard, Redmond, WA (US); Daniel John Spoonhower, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 10/783,124

(22) Filed: Feb. 19, 2004

(65) Prior Publication Data

US 2005/0065973 A1  Mar. 24, 2005

Related U.S. Application Data

(60) Provisional application No. 60/505,205, filed on Sep. 23, 2003.

(51) Int. Cl.
G06F 17/30 (2006.01)
G06F 7/00 (2006.01)

(52) U.S. Cl. .................. 707/103 R; 707/101; 707/102

(58) Field of Classification Search ................ 707/103, 707/206, 103 R, 102, 101
See application file for complete search history.

(56) References Cited

U.S. PATENT DOCUMENTS 4,989,132 A * 1/1991 Mellender et al. .......... 717/139
5,687,368 A * 11/1997 Nilsen ..................... 707/103 R
6,249,793 B1 * 6/2001 Printezis et al. ............ 707/206
6,839,895 B1 * 1/2005 Ju et al. ..................... 717/159
6,865,657 B1 * 3/2005 Traversat et al. ........... 711/170
6,964,037 B1 * 11/2005 Pavlovic et al. ............ 717/135
2005/0234985 A1 * 10/2005 Gordon et al. ........... 707/104.1

OTHER PUBLICATIONS

Rugina et al: Pointer Analysis for Structured Parallel Programs, Jan. 23, ACM Transactions on Programming Langauages and Systems.*
Daniel Spoonhower and Bjarne Steensgaard, "Region-Based Memory Management for an Object-Oriented Language," *CMU Principles of Programming Seminar*, Oct. 22, 2003, 22 pages.
Morten V. Christiansen and Per Velschow, "Region-Based Memory Management in Java," Master's thesis, University of Copenhagen, May 29, 1998, 151 pages.
Fritz Henglein, Henning Makholm, and Henning Niss, "A Direct Approach to Control-Flow Sensitive Region-Based Memory Management," in *Proceedings of the 3rd International ACM SIG-PLAN Conference on Principles and Practice of Declarative Programming (PPDP)*, ACM, 2001, 12 pages.
Mads Tofte and Jean-Pierre Talpin, "Implementation of the Typed Call-by-Value λ-Calculus Using a Stack of Regions," *Proceedings 21st SIGPLAN-SIGACT Symposium on Principles of Programming Languages*, ACM Press, Jan. 1994, pp. 188-201.
Erik Ruf, " Effective Synchronization Removal for Java," Aug. 4, 2000, 12 pages.

* cited by examiner

*Primary Examiner*—Kuen S. Lu
(74) *Attorney, Agent, or Firm*—Klarquist Sparkman, LLP (57) ABSTRACT

An object-oriented program is modified to create objects within specified regions, allowing memory de-allocation to take place for entire regions at once. The contents and associations between the regions are described by one or more shape graphs, which are created from an analysis of the program code. The region association metadata stored by the shape graphs allows the region-based memory management to take place while requiring no more than one region to be passed to methods for each object passed.

12 Claims, 9 Drawing Sheets

Fig. 7a
args.length > 1

Fig. 7b
args.length <= 1

REGION-BASED MEMORY MANAGEMENT FOR OBJECT-ORIENTED PROGRAMS

CROSS-REFERENCE TO RELATED APPLICATION

This application claims the benefit of U.S. Provisional Application No. 60/505,205, filed of Sep. 23, 2003.

TECHNICAL FIELD

The invention relates generally to memory management for object-oriented programs.

BACKGROUND

Various programming languages, such as ML, C#, and Java, are constructed in a way that allows allocation of memory to be controlled by programmers, but performs de-allocation automatically by runtime mechanisms. The majority of these runtime systems employ a garbage collector, which traces object references during execution in order to find objects which are no longer being used and de-allocate and reuse their memory. However, most garbage-collection systems suffer from defects. Chief among these are the introduction of a runtime execution cost and a lag time between the time an object's memory could be reclaimed and when the garbage collector manages to find the object.

As an alternative, some systems employ a region-based memory management system. In a region-based scheme, regions are allocated in memory for objects to be placed into, and memory de-allocation happens for entire regions rather than at an object-level. Region-based memory management reduces overhead by reducing the number of memory allocations for which the runtime environment must keep track and consolidates memory de-allocation that a garbage collector might do in a piecemeal fashion. One example of region's utility is upon a call to a method which creates data structures for its execution, but which then deletes those data structures when it returns. In this situation, each region used by the method can be created when the method is called, and then deleted at the point the method is returned.

Because the number of regions is usually smaller than the total number of objects allocated, a runtime system using region-based memory management need only keep record of the number of references to objects in a region. This allows the runtime system to de-allocate a region immediately when the reference count reaches zero. This avoids the constant searching involved in garbage collection and reduces lag time for memory reclamation.

However, traditional region-based memory management systems introduce additional overhead costs of their own. Many existing systems determine at compile-time precisely when regions are allocated or de-allocated. In order to facilitate this statically-determined memory management, some of these systems force allocation and de-allocation of regions into a last-in, first-out (or stack) model. This type of system, however, reduces memory allocation efficiency by severely restricting the order in which regions can be de-allocated.

In other existing systems, no allocation order is set, but additional overhead costs are created because the system requires that objects passed to methods be passed along with whatever regions contain objects that may be used in the method. One of these, RegJava, a Java language extension by Christiansen and Velschow, requires that when an object is passed to a method that every subclass of the object's class be known and annotated in the source code. This is done in order to ensure that at compilation every region possibly referenced by the passed object is available to be passed to the called method. Because subclasses frequently contain fields that their superclasses do not, this means that many regions can possibly be referenced by an object of a given superclass. This can result in large numbers of regions being passed as method parameters. This additional argument-passing can exceed the number of registers available, adding more overhead to the runtime stack, and thus reducing or eliminating the efficiencies provided by a region-based system. What is needed is a system that can dynamically discover regions which contain referenced objects.

SUMMARY

A region-based memory management system employing shape graphs is described. In one embodiment, a memory management system is described which partitions memory into a plurality of regions and uses one or more shape graphs so that given an object, the region containing the object can be found. In another embodiment, a method for compiling an object-oriented program for a region based memory-management system is described. The method receives source code, and then performs a points-to analysis on the code to create one or more shape graphs. The method adds instrumentation to utilize the shape graphs for object-creation and region-deletion before generating code which can be executed.

In yet another embodiment, a computer-readable medium is described containing instructions which cause a computer to compile a program for a region-based memory-management system. The instructions cause the computer to receive source code, perform a points-to analysis on the code to create one or more shape graphs, and add instrumentation to utilize the shape graphs for object-creation and region-deletion before generating code which can be executed.

Additional features and advantages of the invention will be made apparent from the following detailed description of embodiments that proceeds with reference to the accompanying drawings.

DETAILED DESCRIPTION

The following description is directed to techniques and systems for a region-based memory management system using shape graphs. The systems and techniques allow for the creation of one or more shape graphs for an object-oriented program at compile-time. These graphs provide metadata which describes a template for region creation and object allocation within regions. The shape graphs are included within the compiled program, along with instrumentation which allows the program to analyze the graphs and use the graphs to place objects within regions and to create and access regions. This, combined with a reference-counting de-allocation scheme, creates a more efficient use of memory regions with less parameter-passing and fewer use limitations than exists in current techniques. The region-based memory management system may also be combined with a garbage collector to increase the efficiency of memory de-allocation.

1. Illustrated Embodiment

Figure 1:
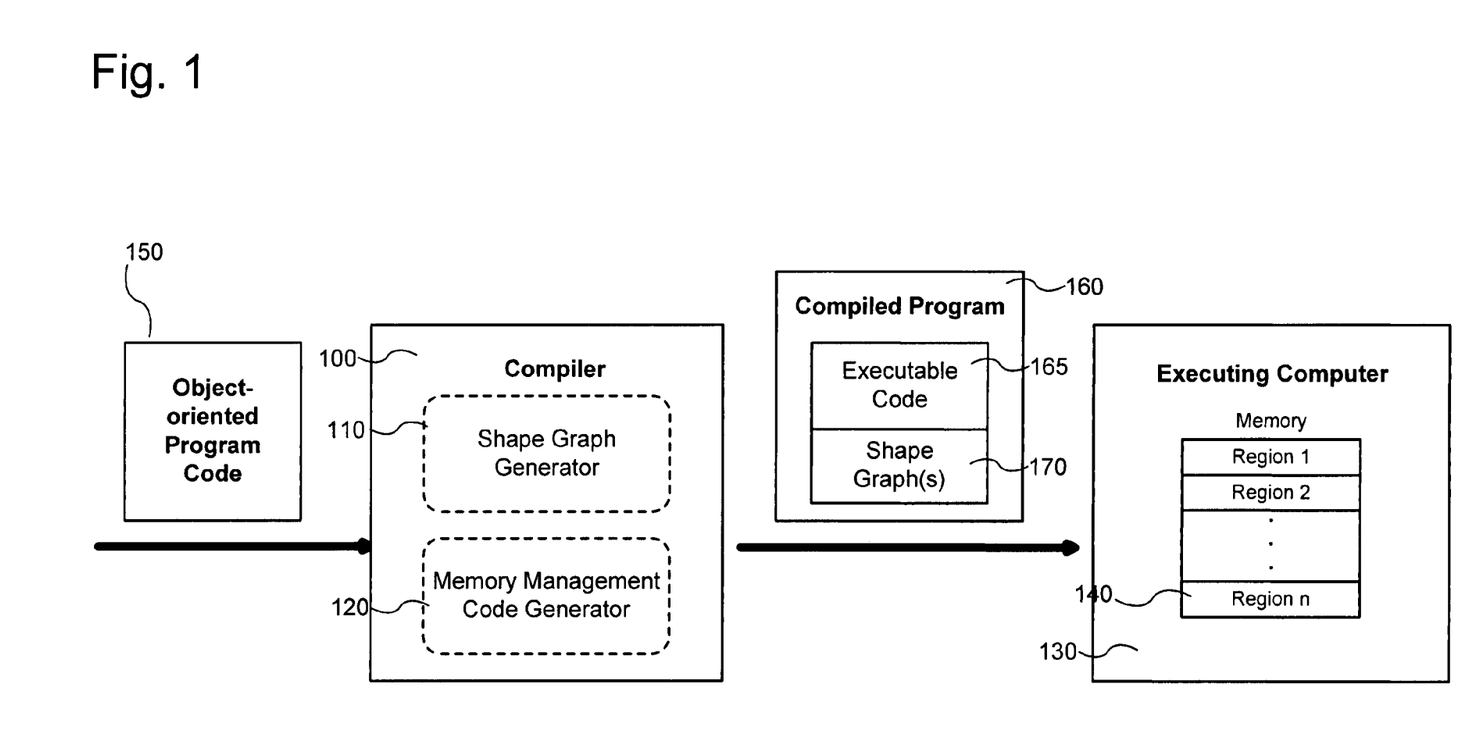
FIG. 1 is a block diagram illustrating one implementation of a region-based memory management system employing shape graphs.

FIG. 1 illustrates one implementation of a region-based memory management system employing shape graphs. The illustrated embodiment shows a compiler 100 which accepts object-oriented program code 150 for compilation into a compiled program 160. In alternate implementations, the object-oriented program code can comprise Java source code, C# source code, ML source code, or others. Additionally, while the illustrated embodiment depicts the compilation of a single piece of program code, in another implementation, code comprising many separate pieces of code or libraries may be used. The compiled program 160, comprising executable code 165 and one or more shape graphs 170, can then be executed by an executing computer 130 containing memory 140 comprising multiple regions.

In the illustrated embodiment, the compiler 100, in addition to traditional compilation components (not shown), comprises two modules to facilitate region-based memory management in executing computer 130. One of these illustrated modules is the shape graph generator 110, which comprises software that analyzes the object-oriented code 150 to create at least one shape graph 170 which is included in the compiled program 160 in order to facilitate later execution in a region-based system. The other illustrated module of the compiler 100 is the memory management code generator 120. In one embodiment, this module comprises software which analyzes the object-oriented program code 150 and inserts additional instrumentation into the executable code 165 of the compiled program 160 to facilitate region-based memory management activities, such as region and object allocation, association between regions, and location of regions. In one implementation, the shape graph generator and memory management instrumentation generator do not comprise separate software modules but are instead incorporated into the compiler 100. In one implementation, the memory management code generator 120 adds code to the object-oriented program code 150 directly; in another implementation, the generator 120 inserts machine or bytecode directly into the executable code 165 of the already-compiled program 160 before making it available for execution.

2. Example of Region-Based Memory Including a Shape Graph

Figure 2:
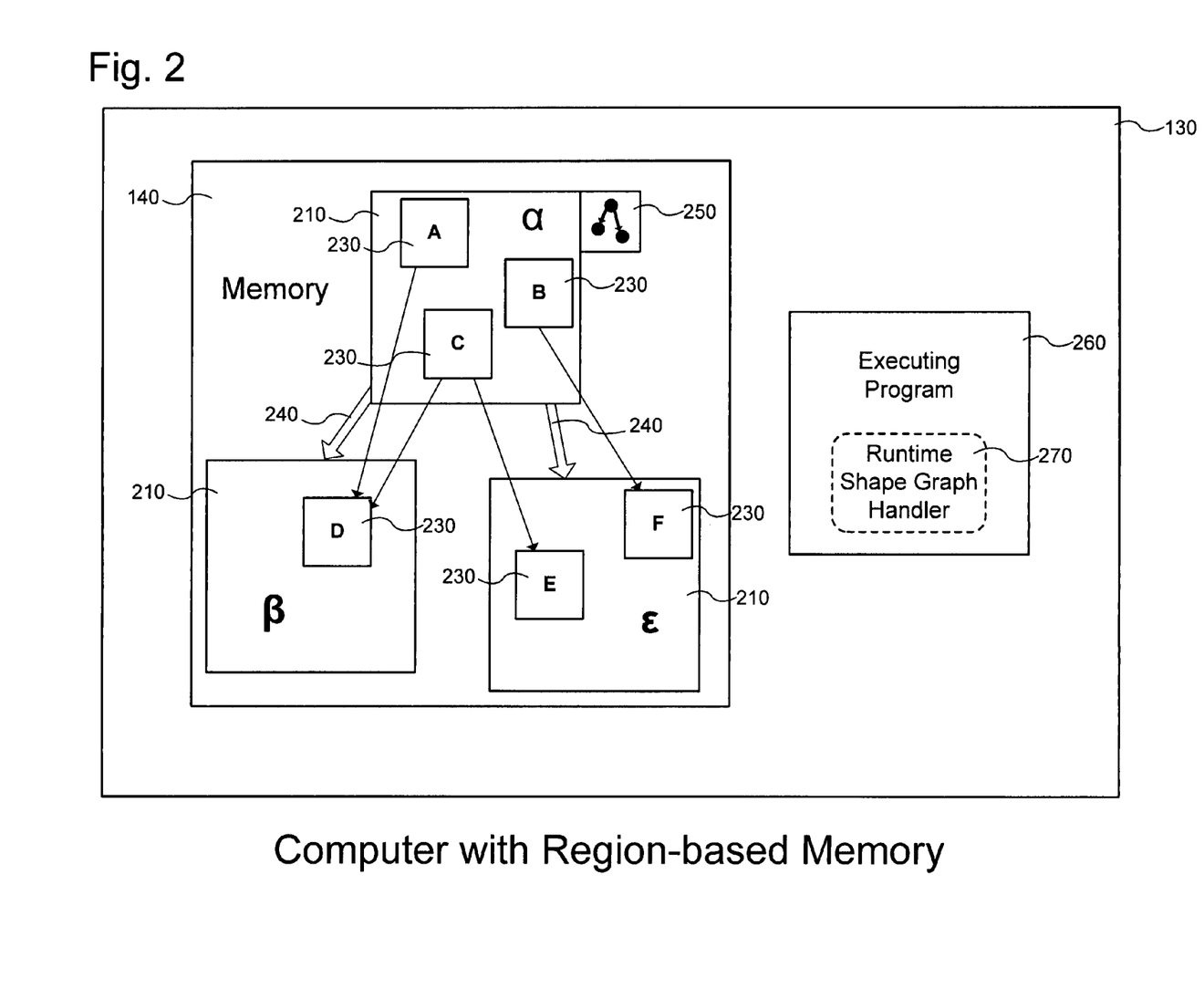
FIG. 2 is a block diagram of an exemplary computer executing a program in a region-based memory management environment using shape graphs.

FIG. 2 illustrates a block diagram showing an exemplary computer 130 utilizing region-based memory 140. In the illustrated embodiment, the memory comprises three regions 210 each containing various objects 230. As FIG. 2 illustrates, objects contained in a region-based memory-system may contain references to other objects, as illustrated by the thin arrows connecting the objects 230. For example, object C in region α in FIG. 2 contains both a reference to object D in region β and a reference to object E in region ε. Additionally, object A also contains a reference to object D and object B contains a references to object F. In one implementation, these references comprise fields contained in objects A, B, and C. Alternatively, references to objects may also be maintained within local method or function variables. For the sake of simplicity, the term "field" as used herein, will refer generally to any object reference, including global and local variables, not solely to fields described in object classes.

FIG. 2 also shows associations between regions 210, illustrated by the thick arrows 240. In the illustrated example, these associations represent the existence of references between objects contained within the regions. Thus, because objects in region α contain references to objects in region ε, the two regions share an association. In a preferred embodiment, these associations are not actually maintained as separate entities within the computer 130, but rather are kept in one or more shape graphs, which are maintained along with regions to allow the computer 130 to locate objects and create region associations. Thus, in the example, a shape graph 250 is maintained along with region α which shows that region α has objects which are contained in the other two illustrated regions. While the illustrated example demonstrates maintaining one shape graph 250 in association with region α in alternate implementations a plurality of shape graphs may be maintained. While in the illustrated example the region 250 is maintained along with region α, in another implementation shape graphs are maintained separately from the memory regions 210. Alternatively, a global shape graph may be kept which describes associations between all possible regions.

The shape graph 250 contains metadata which maintains associations between regions based on object references by containing nodes representing regions and directed edges between the nodes which demonstrate associations between regions. In one implementation, the shape graph edges represent reference names. As an example, the shape graph 250 could contain information that any object referenced by a field called "age" in an object in region α will be contained in region β by containing α and β nodes connected by a "age" edge. In alternate implementations, shape graphs may associate regions by different or additional information, such as object type, level of protection of the reference, or by utilizing unique field identifiers. In one implementation shape graphs are maintained as data structures describing nodes and edges. In alternate implementations, different data structures may be used, as long as the structures comprise metadata which maintains associations between regions.

In one embodiment regions are allocated and associated with each other based on information in the shape graph 170 during the execution of the program. This is performed by using shape graphs as a templates for runtime region creation and association. In one implementation, regions are created during execution when they are first used. In another, when one region is created, if that region is described in a reachable subset of the shape graph then all other regions represented in the subset are created as well.

FIG. 2 also illustrates a runtime shape graph handler module 270, running within the executing program 260, which can analyze the shape graph 250 to determine the region associations, allocate objects properly, and provide for region allocation and de-allocation. For instance, if at a particular point in the execution of a program on computer 130 the object D was not yet created, the shape graph handler module 270 would be able to create the memory region β and allocate the object D within it at the time the object was to be created. In the illustrated embodiment, the shape graph handler 270 comprises a discrete module within the executing program 260. In another implementation a separate runtime environment does not exist, and the functions of the shape graph handler are included in the compiled program 160 at compilation. In yet another implementation the shape graph handler is incorporated into the runtime environment in which the executing program runs.

3. Creation of Shape Graphs

Figure 3:
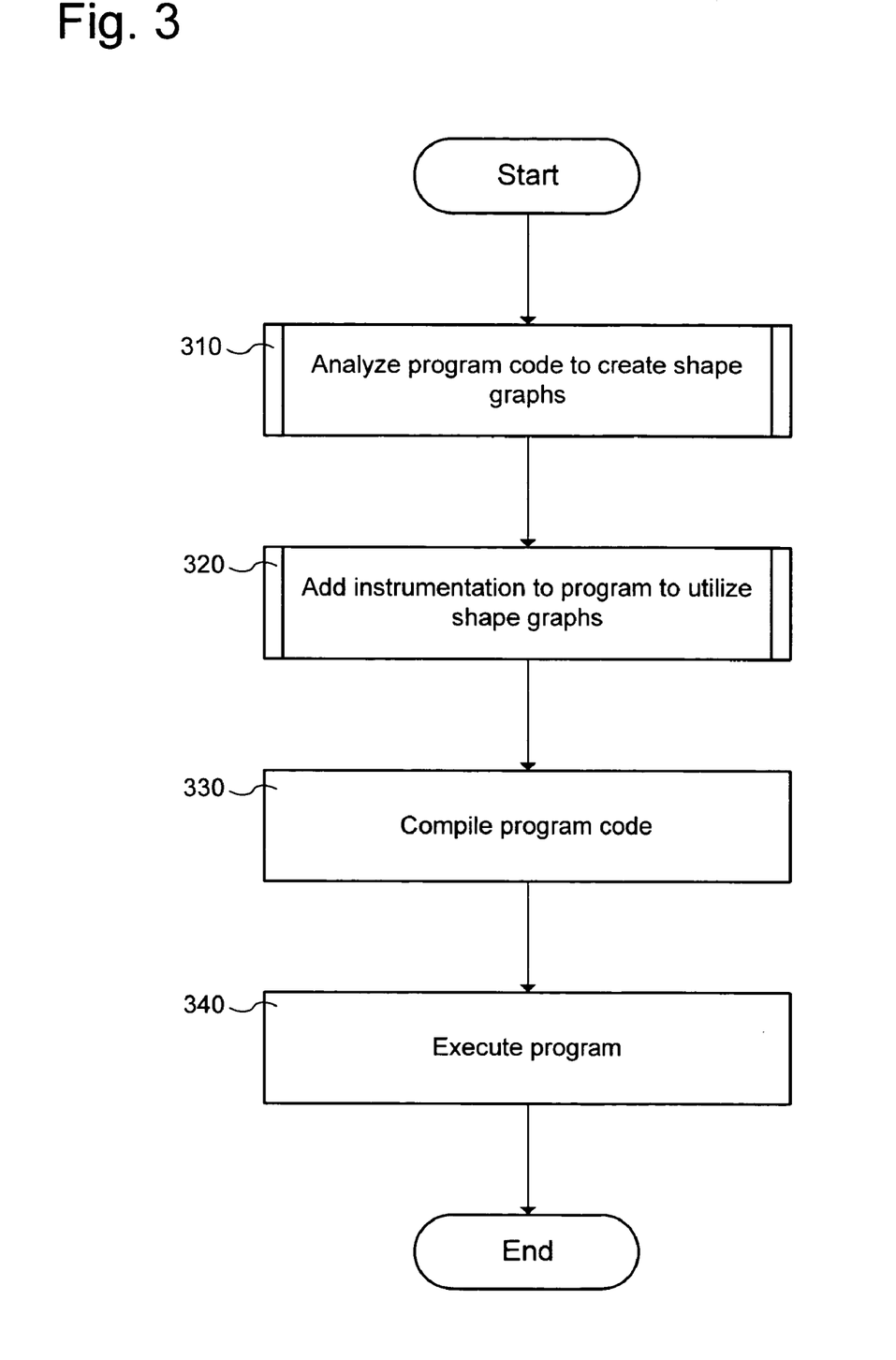
FIG. 3 is a flowchart illustrating a process for creating and executing an object-oriented program employing shape-graphs for region-based memory management.

FIG. 3 illustrates, in one embodiment, a process for creating a program using region-based memory management employing shape graphs. In alternate implementations, the process represented in FIG. 3 may be modified; blocks may be performed in a different order, may be combined, or may be broken into sub-blocks. The process starts at block 310, where the program code 150 is analyzed to create one or more shape graphs 170. The process of shape graph creation is described in more detail with respect to FIGS. 4, 5, and 6. The process of FIG. 3 continues to block 320 where instrumentation is added to the object-oriented program code 150 by the memory management code generator 120 to allow the computer 130 to utilize the shape graphs at runtime. Next, at block 330, executable code is generated from the modified object-oriented program code 150. Finally, at block 340, the shape graph 170 created in the process of block 310 is included with the executable code 165 generated in the process of block 330 to create the completed compiled program 160.

Figure 4:
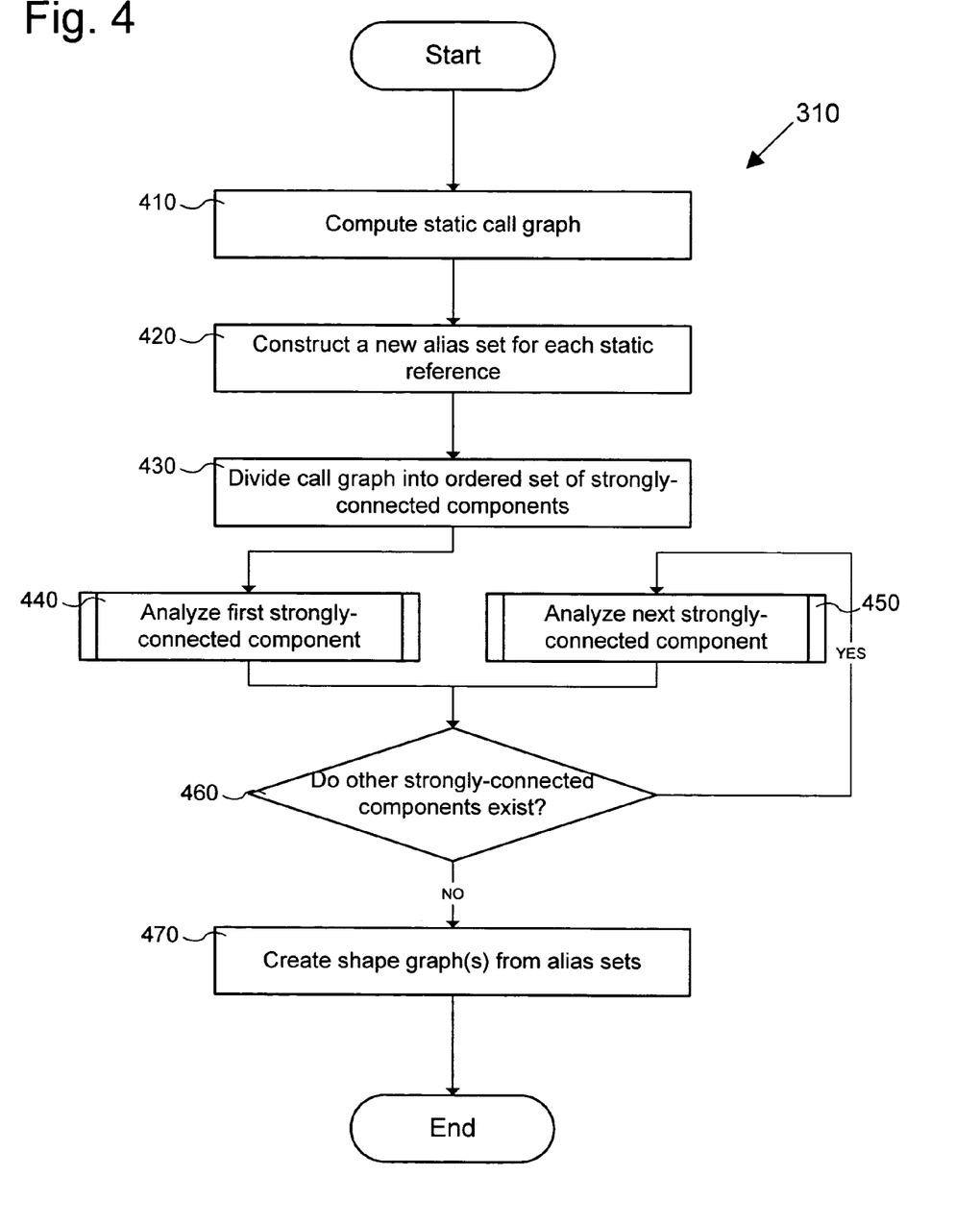
FIG. 4 is a flowchart illustrating an additional process for creating an object-oriented program employing shape-graphs for region-based memory management.

FIG. 4 illustrates one example of the process of block 310 of FIG. 3 performed by the shape graph generator 110 for creating shape graphs. In alternate implementations, the process represented in FIG. 4 may be modified; blocks may be performed in a different order, may be combined, or may be broken into sub-blocks. In one embodiment, the process of FIG. 4 is a modified version of the context sensitive points-to analysis for locating synchronizations by Erik Ruf in "Effective Synchronization Removal for Java," (2000) ("Ruf"), which is hereby incorporated by reference. Alternate implementations may employ different shape graph creation processes which are context sensitive or context-insensitive. While the process described below utilizes the term "method" it will be recognized that the process applies to programming languages which utilize other terminology, such as "function." In an alternative embodiment a points-to analysis algorithm is used which is similar to the kind described in U.S. Pat. No. 6,014,518 to Steensgaard, "Terminating Polymorphic Type Inference Program Analysis," ("Steensgaard") which is hereby incorporated by reference.

The process starts at block 410, where the program is analyzed to compute a static call graph, which indicates, for every method, which methods are called by that method. Subsequent blocks are concerned with the creation and manipulation of alias sets, from which shape graph nodes and edges are created. An alias set, as described in Ruf, is a data structure used to represent a set of object references, along with mappings from field names to other alias sets. In one implementation, the field names come from fields of the objects represented by the alias set when they are used in the program code 150.

Besides storing mappings from fields to other alias sets, alias sets support unification operations, detailed by Ruf, which combine existing alias sets. Unification operations are performed according to statements contained in the program code 150. During analysis of an object-oriented program, the process of FIG. 4 will utilize alias set creation and unification to result in alias sets which together represent object references in the program. After the analysis of an object-oriented program, the process of FIG. 4 will have created alias sets which together represent every object reference in the program. By creating shape graph nodes from the alias set with connecting edges defined by the alias sets' mappings, shape graphs are created. In different implementations the shape graph may be maintained in various data structures, as long as the directed graph nature of the shape graph is maintained.

While Ruf describes one formal use of and makeup of alias sets in "Effective Synchronization Removal for Java," the alias sets described in Ruf contain additional data which are not required for shape graph creation. Thus, in one implementation an alias set comprises only a field map and an indication of whether one of the object references the alias set refers to can be reached from a global variable. As an example, the alias set for a reference to an object which has fields "name" and "age" could comprise <<name→$\alpha_1$, age→$\alpha_2$>,no>, where $\alpha_1$ and $\alpha_2$ are other alias sets representing the references made by the object's "name" and "age" fields, respectively, and the "no" indicates that the variable cannot be reached from a static global variable are other alias sets representing the references made by the object's "name" and "age" fields, respectively, and the "no" indicates that the variable cannot be reached from a global variable. In one implementation, while global reachability information is kept for the purposes of creating shape graphs, it is not required for execution. Thus, in one implementation, the reachability information may be discarded before final creation of shape graph.

Continuing to block 420, an alias set is computed for each object reference in the object-oriented program code. Because alias sets as described by Ruf are initially created with empty field maps, the alias sets created for each field in block 420 will be created empty. The process continues to block 430 where the static call graph created in block 410 is divided into a set of strongly-connected components, which are to be analyzed individually. This process allows the shape graph generator module 110 to analyze the program code 150 in smaller segments and to ignore methods and fields which are not referenced within a strongly-connected component, increasing the efficiency of the analysis. In another implementation, the call graph is not divided into strongly-connected components. Additionally, at block 430 the strongly-connected components are placed in order. In the preferred implementation this is done in bottom-up topological order although in other implementations other orderings may be utilized.

Next, at block 440, the first strongly-connected component is analyzed to create and unify alias sets based on statements in the program code 150. This analysis process is described in greater detail below with respect to FIGS. 5 and 6. After the first strongly-connected component is analyzed, the process continues to decision block 460, where the shape graph generator 110 determines if there is an additional strongly-connected component. If so, the process continues to block 450, where the next strongly-connected component is analyzed and the process is repeated. If not, the process continues to block 470, where the alias sets, which have been modified and enriched by the analysis of blocks 440 and 450 are converted into shape graphs. In one implementation, information contained in the alias sets about global rechability is discarded before creation of shape graphs. The process then ends.

Figure 5:
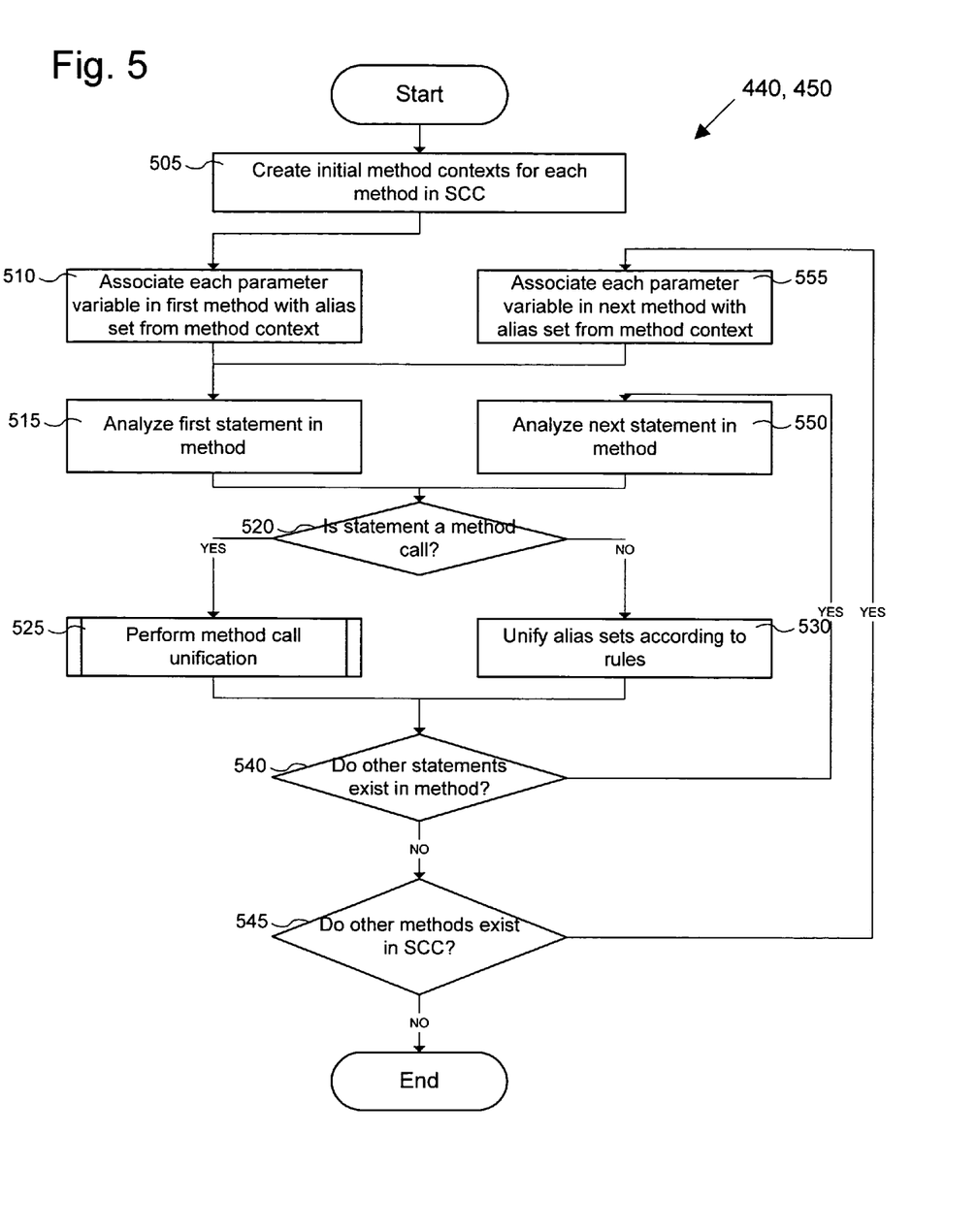
FIG. 5 is a flowchart illustrating an additional process for creating an object-oriented program employing shape-graphs for region-based memory management.

FIG. 5 illustrates one example of the process of blocks 440 and 450 of FIG. 4 performed by the shape graph generator 110 of compiler 100 for analyzing the strongly-connected components ("SCCs") of the program code 150 to create shape graphs. In alternate implementations, the process represented in FIG. 5 may be modified; blocks may be performed in a different order, may be combined, or may be broken into sub-blocks. The process starts at block 505, where an initial method context is created for each method in the strongly-connected component being analyzed. As Ruf describes, a method context is a tuple of the form $<<f_0,K,f_n>,r,e>$ where each of the $f_i$'s, r, and e, are alias sets corresponding to the formal values received by the caller of the method, the return value, and the exception value for that method. In alternate implementations more than one exception value may be used, or none at all may be used. Method contexts are created in order to allow alias sets created in called methods to be systematically reflected by alias sets created for the context where the method is called, making a more complete and context-sensitive shape graph template analysis. Next, each method in the SCC is analyzed in turn.

The process continues to block 510 where each parameter variable in the first analyzed method is associated with its corresponding alias set from the method context. The process then analyzes the first statement at block 515 to determine the process that is performed in the statement. As Ruf describes, if the statement modifies references variables, processes a value, or calls a method, alias sets may need to be unified. Next at decision block 520 the shape graph template generator 110 determines whether the statement analyzed is a method call. If it is, the process continues to block 525, where unification of alias sets is performed according to particular method call rules. The process of unifying alias sets over method calls is described in greater detail below with respect to the process of FIG. 6.

If, however, the statement is determined not to be a method call at decision block 520, the process continues to block 530, where alias sets are unified according to alias set analysis rules. As an example, if the statement $v_0 = v_1.f$ is encountered, where $v_0$ and $v_1$ are local object references and f is a field name, a unification will take place. In the given example, the rule causes the alias set associated with $v_0$ and the alias set mapped to by $f$ in the alias set for $v_1$ to be unified. The practical effect of this unification is to cause references to $v_0$ to lead to the same alias set as references from the $f$ field of $v_1$. Later, when the shape graph is used at execution, objects that are referred to by the $v_0$ variable and by the $f$ field of $v_1$ will be allocated in the same region. An example list of analysis rules can be found in Ruf.

Regardless of the statement type, the process then continues to decision block 540, where the shape graph generator determines whether other statements exist in the currently-analyzed method. If other statements do exist, the process continues to block 550 where the next statement in the method is analyzed. If there are no more statements in the method, the process continues to decision block 545 where the shape graph generator determines if other methods exist in the SCC. If so, the process continues to block 555 where parameter variables in the next method are associated with alias sets from that method's method context. If, however, there are no more methods in the SCC, the process of FIG. 5 ends.

Figure 6:
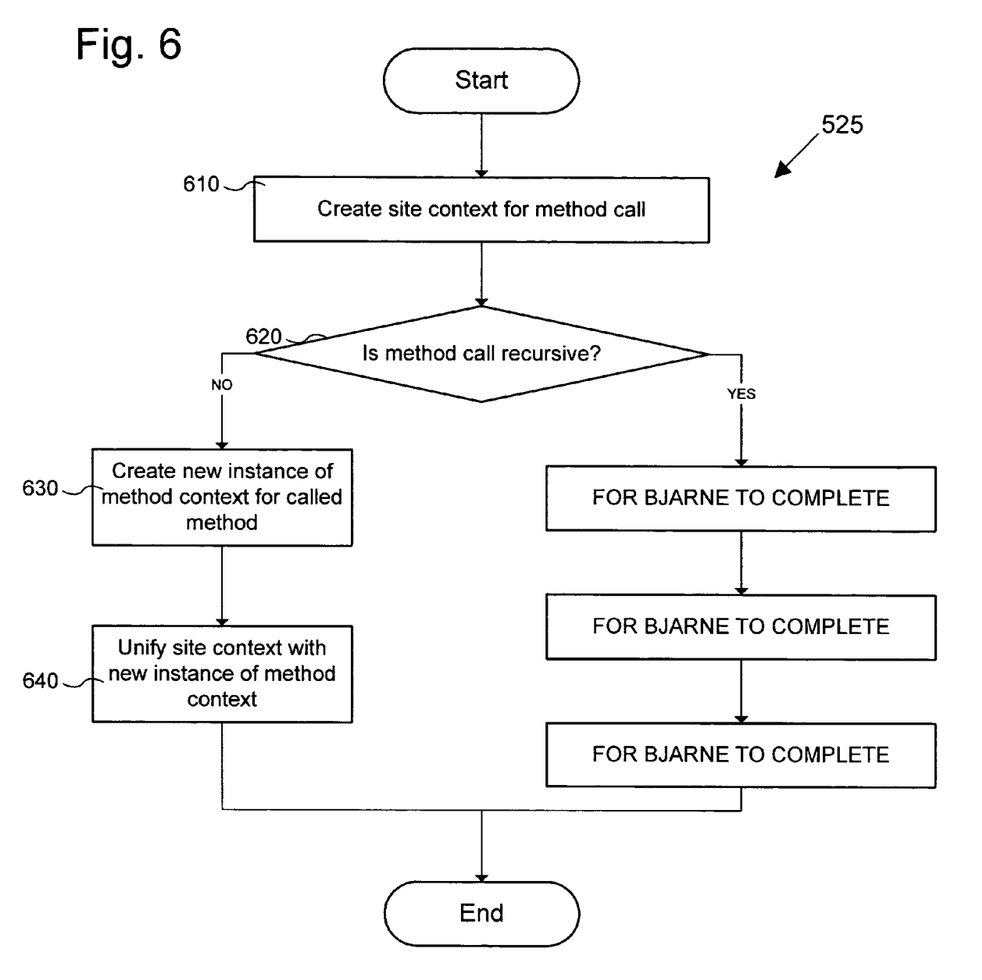
FIG. 6 is a flowchart illustrating an additional process for creating an object-oriented program employing shape-graphs for region-based memory management.

FIG. 6 illustrates one example of the process of block 525 of FIG. 5 performed by the shape graph generator 110 of compiler 100 for performing alias set unification or instantiation due to a method call. In one implementation, method calls which undergo the process represented in FIG. 6 include not only specially-defined class methods but also constructors and destructor methods. In alternate implementations, the process represented in FIG. 6 may be modified; blocks may be performed in a different order, may be combined, or may be broken into sub-blocks. The process begins at block 610, where a site context is created for the method call. A site context takes the same $<<f_0,K,f_n>,r,e>$ form as a method context, but instead of representing values received from a caller or returned to a caller, the $f_i$'s represent actual values transmitted to the callee, and r and e represent values returned by the callee.

Next, at decision block 620, the shape graph generator 110 determines whether the method call is recursive. If the call is not recursive, the process continues to block 630, where a new instance of the method context for the called method is created. In one implementation, the creation of a new method context creates a method context with alias sets that are isomorphic to the original ones. In this implementation, the isomorphic alias sets used in the new instance are newly-created instances of alias sets, unless the alias set being copied from is available from a global variable, in which case the original alias set is used in the new method context instance. Next, at block 640, the site context is unified with the new instance of the method context by unifying each alias set of the site context with its corresponding alias set in the new method context. The creation of a new instance of the method context allows a context-sensitive analysis. After this unification, the process then ends. In an alternative implementation, the effects of the processes described by blocks 630 and 640 are achieved by an instantiation process using polymorphic type inference similar to the kind described in Steensgaard.

If, however, the method call is recursive, at block 650 the call site context is unified with the existing method context for the called method without creating a new method context. While in one implementation the different treatment of recursive method calls creates context insensitivity, it prevents the performance costs of having to iterate over the entire SCC until a fixed point is reached for the recursive call. After this unification, the process then ends. In an alternative implementation, the effects of the process described by block 650 are achieved by an instantiation process using polymorphic type inference similar to the kind described in Steensgaard.

4. Example of Shape Graph Effect on Region Creation and Object Allocation

Figure 7A:
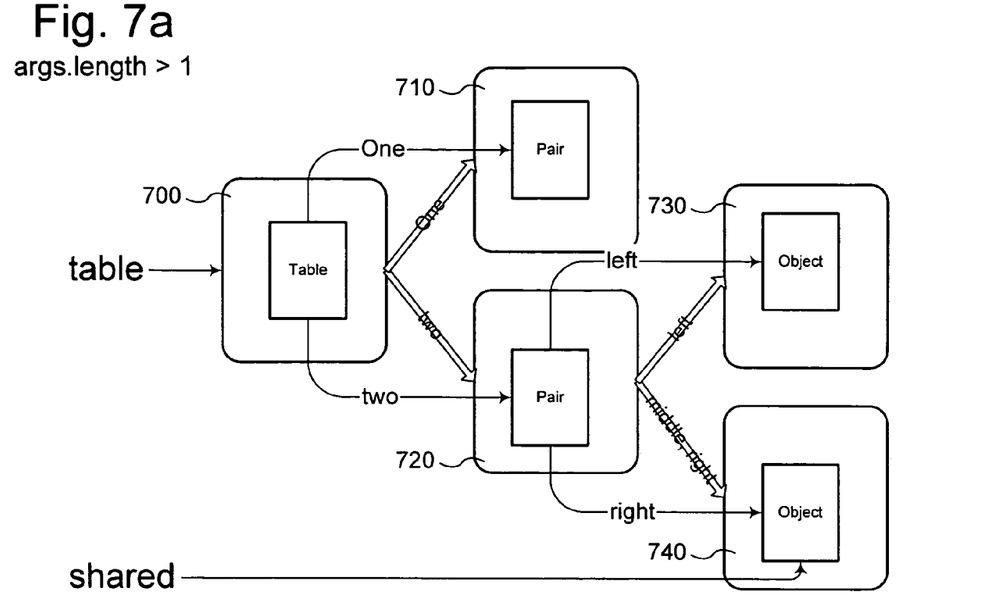
FIGS. 7a and 7b are block diagrams illustrating exemplary storage of objects in memory regions based on a common shape graph.
Figure 7B:
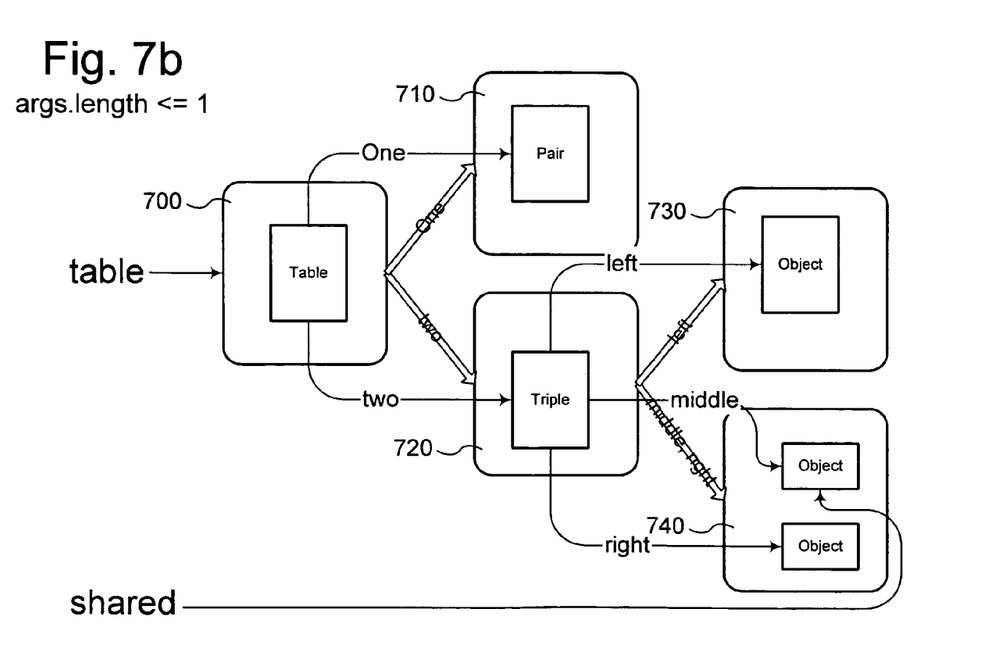

FIGS. 7a and 7b illustrate two examples of objects stored in regions according to a common shape graph. In the illustrated example, the shape graph is not shown as a separate entity, but is illustrated through the illustrated edges connecting regions. The shape graph from which both examples are derived is created from an analysis of the following code:

```
public class Table {
   public Object One;
   private Pair two;
   public Pair Two {
      get { return this.two; }
      set { this.two = value; }
   }
}
public class Pair {
   public Object left;
   public Object right;
   public Pair( ) {
   }
   public Pair(Object a, Object b) {
      this.left = a;
      this.right = b;
   }
}
public class Triple: Pair {
   public Object middle;
   public Triple( ) {
   }
   public Triple(Object a, Object b, Object c): base(a, c) {
      this.middle = b;
   }
}
public class Test {
   public static int Main(String[ ] args) {
      Table table = new Table( );
      table.One = new Pair( );
      Object shared = new Object( );
      if (args.Length > 1) {
         table.Two = new Pair(new Object( ); shared);
      } else {
         table.Two = new Triple(new Object( ), shared, new Object( ));
      }
   }
}
```

The two examples show differences in the type and number of objects located in the regions which depend on the execution of the program. The two possible executions of the example code are parameterized by argument length. An analysis of the code creates a shape graph which comprises a template for the creation of five memory regions, as FIGS. 7a and 7b illustrate. The first memory region, region 700, will always, after execution, contain a Table object referred to by the local field "table." The second, region 710, will always contain a Pair object referred to by the "One" field of the Table of region 700.

Region 720, however, may contain different types of objects. The shape graph describes region 720 as containing a objects referred to by the "two" field of objects of region 700. However, as the code, FIG. 7a, and FIG. 7b illustrate, in one execution of the code a Pair object is allocated in region 720 and in another execution of the code a Triple object is located in region 720. This is done because Triple is a subclass of Pair and either the Pair of FIG. 7a or the Triple of FIG. 7b ends up referred to by the "two" field of the object in region 700. Thus, as FIGS. 7a and 7b illustrate, a region can contain objects of different classes. FIGS. 7a and 7b also demonstrate that, in one implementation, the analysis does not incorporate differences between public and private fields into the shape graph. The "One" field is a public field and the "two" field is private, but because both refer to objects, both are included in the shape graph.

As in regions 700 and 710, the shape graph from which both FIGS. 7a and 7b are formed describes region 730 as containing objects referred to by the "left" field of the objects of region 720 and describes region 740 as containing objects referred to by the "right" field of objects in region 720. Region 740, however, has different contents depending on the execution of the program. FIG. 7a, which illustrates the program execution where the length of the program arguments is greater than 1, the "two" field refers to a Pair object, which has only "left" and "right" fields. Thus, there is only a single object, referred to by "right," in the region 740. In contrast, in FIG. 7b, the "two" field refers to a Triple object, which contains not only the "left" and "right" fields of a Pair, but additionally contains a "middle" field. And because the shape graph which provides a template for FIGS. 7a and 7b provides that objects referred to by either the "middle" and "right" fields should be contained in the same region, in FIG. 7b, region 740 contains the two objects referred to by the "middle" and "right" fields.

In the illustrated examples, the shape graph describes the referents of both the "middle" and "right" fields as being in the same region rather than putting them in separate regions. In one implementation, this is a direct result of the use of alias sets as described by Ruf for shape graph creation. The reason for this in the example of FIGS. 7a and 7b is the existence of the "shared" reference in the main method. Under the two possible executions of the program, "shared" may be assigned to either the "right" field of a Pair object in region 720 or the "middle" field of a Triple object in region 720. As a consequence of the assignment to the "right" field, objects referenced by the "shared" and "right" fields must be in the same region. Similarly, as a consequence of the assignment to the "middle" field, objects referenced by the "shared" and "middle" fields must be in the same region. However, in order to allow objects to be consistently available, the field "shared" references objects in one region only. Thus, for the example code above a shape graph is created which puts objects referred to by "middle" and "right" in the same region.

5. Instrumentation for Utilizing Shape Graphs

Figure 8:
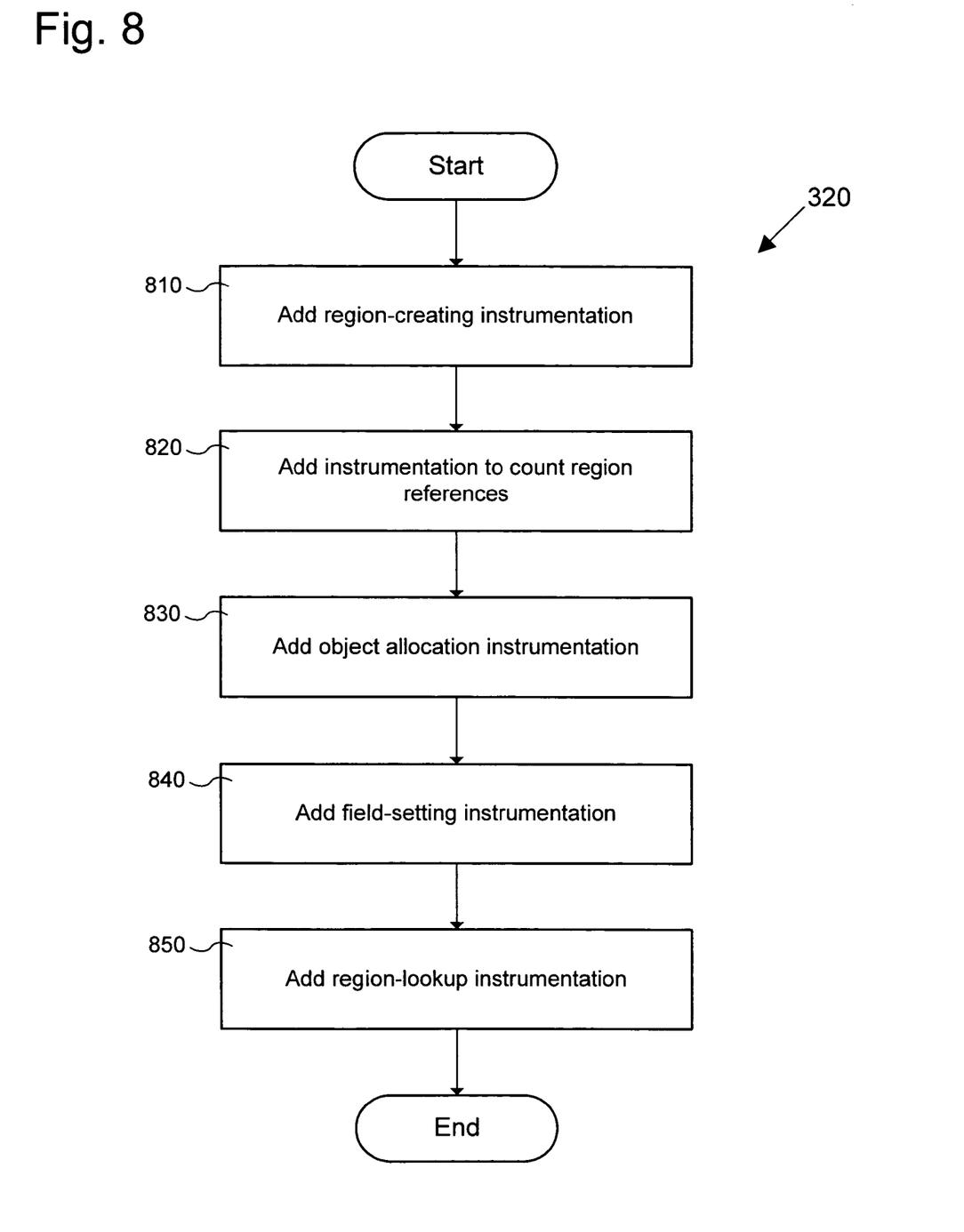
FIG. 8 is a flowchart illustrating a process for adding instrumentation to an object-oriented program employing shape-graphs for region-based memory management.

FIG. 8 describes one implementation of the process performed in block 320 by the memory management code generator 120 for adding instrumentation to utilize shape graphs. In alternate implementations, the process represented in FIG. 3 may be modified; blocks may be performed in a different order, may be combined, or may be broken into sub-blocks. The instrumentation added by the processes of FIG. 8 in one implementation may be added as source code, such as method calls or inlined code, prior to compilation. Alternately, the instrumentation is added to code on which compilation has begun or is completed, such as in the form of bytecode or machine code. Additionally, the inclusion of some instrumentation may involve the manipulation or transformation of existing program code rather than only the addition of new code. While one implementation consolidates region and shape graph handling routines into the shape graph handler 270 of the executing program 260, in other implementations the routines are generally incorporated into the code of the object-oriented program.

The process beings at block 810, where region-creating instrumentation is added. In one implementation, the instrumentation accepts a global shape graph and allocates a region based on an indication of which region from the shape graph is needed. In another implementation, only the section of the shape graph necessary to describe the region is given to the region-creating instrumentation. Additionally, different implementations may create regions at different times during execution. In one implementation, all regions corresponding to a reachable subset of a shape graph are created at the same time. In another, regions are created as-needed by the program.

Region-creation instrumentation may also, in one implementation, include instrumentation for the simultaneous creation of sets of regions which are strongly-connected in the shape graph. This is useful because, in one implementation, reference counters are used to keep track of which regions are still being used in during the execution of the program. If separate counters were kept for each region in a strongly-connected set a condition could develop during program execution where no references exist from any regions outside the set, yet because of the strongly-connected nature of the set, references could still exist inside. Thus, the reference counter for the regions might never reach zero, even though, relative to the rest of the program, the set is "dead" and cannot be referenced again by any object outside the set. This would keep the regions artificially alive, rather than being de-allocated and having their memory returned to the system. Thus, in one implementation, if the shape graph is determined to describe a set of strongly-connected regions, instrumentation is added creating all the regions at once rather than separately. In another implementation, strongly-connected region sets are not created simultaneously, although in order to avoid the problem described above different instrumentation with regard to reference counters is useful. In another implementation, strongly connected components in the points-to graph are reduced to single nodes in the shape graph, which ensures that the shape graph is a directed acyclic graph.

The process then continues to block 820, where instrumentation is added allowing the program to count region references. In one implementation, this involves the creation of reference count variables for every region. In another, the reference count variables for strongly-connected region sets are combined into a single count which counts only references from regions outside the strongly-connected set. The use of a single count for strongly-connected region sets prevents the problem mentioned above by ignoring references among regions inside the set. Alternatively, a single count may be kept for each subset of a strongly-connected set that is strongly-connected at each point during execution. When subsets of the larger strongly-connected set are linked by a reference during runtime, the counts can then be merged into a single count.

In addition to the reference counts for regions, in block 820 the memory-management code generator 120 also adds instrumentation to increment and decrement reference counts. In one implementation, code is added before references are created to add to the reference count for the region for which the reference is created. Thus, every time a reference to an object is created, the reference count for that object's region is increased by one. In one implementation of the decrementing instrumentation, a last-use analysis is performed on the code during compile-time by the memory-management code generator 120 to determine when the reference counts may be decremented. In another implementation the instrumentation for decrementing reference counters additionally includes instrumentation to de-allocate regions and the objects contained in them. Additionally, in implementations described above, the addition of a reference to an object in a region from a strongly-connected set of regions may cause a single count for the entire set to increment, or may cause the merger of counts.

In block 830, object allocation instrumentation is added to the program. In one implementation, this instrumentation comprises an object allocation routine or method which takes an indication of a region and the type or size of an object and allocates the object within the region.

In block 840 field-setting instrumentation is added. In one implementation, this instrumentation comprises a routine or method which takes an indication of two existing regions and a field and populates the template provided by the shape graph by setting the edge corresponding to the field to the second region. This allows regions which are created lazily during the course of execution to be associated with already-existing regions when the program deems necessary. This can be done both for setting fields that refer to a new object and for setting fields in a new object to refer to objects in older regions.

In block 850 instrumentation is added which allows regions to be looked up. This can be done in multiple ways. In one implementation, a lookup routine or method is used which, given an indication of a region and a field used by an object in that region, finds the region containing the object referred-to by the given field.

In another implementation, additional instrumentation is added to allow regions to be found in particular circumstances so that the field-setting routine described above with respect to block 840 may be used. In particular this is done for methods which take an input object and create a new object in a region reachable from the region containing the input object. The situation exists when the region containing the new object is only indirectly reachable from the region containing the input object. Thus, instrumentation is added which allows the program at runtime to identify the region containing the input object from the shape graph and traverse the shape graph to find the region of the new object while creating regions and region edges as necessary to establish a path or a plurality of paths from the region containing the input object to the region containing the new object. This instrumentation is not limited to this particular example; other situations may arise depending on the structure of the program code which require addition of instrumentation to traverse shape graphs and resolve references to regions which are not directly available.

In another implementation of block 850 instrumentation is added so that regions can be found during method execution. In one implementation this comprises a different lookup routine which, given an object will provide the region in which that object is contained. This implementation would allow the program to execute with a reduced set of shape graphs available, because regions could be directly found from the objects inside them. Thus, objects could be passed into methods with no additional parameters. However, this implementation may provide additional overhead because of the necessity of keeping many object-region associations in runtime memory.

Alternately, instead of keeping track of every object-region associations, another implementation uses shape graphs to find the regions containing objects when those objects are passed into methods. This is done by adding instrumentation so that when an object is passed to a method, the region for the object is found using the shape graph, and passed to the method as well, allowing the region to be maintained properly during method execution. This is similar to the techniques described by Christiansen and Velschow, where many regions where passed with each object. But because in the techniques described herein at most one region is passed per object passed, the overhead implicit in Christiansen and Velschow's techniques is sharply reduced. Additionally, the passing of only the regions that contain a method's input objects prevents out-of-context region information from being incorporated into methods, allowing a programmer studying the method to examine it without reference to the method calling it or methods that it calls.

In one implementation, regions containing argument objects area always passed along with the argument objects when doing a method call. In another implementation, regions are only passed to methods that analysis of the object-oriented code identified as potentially allocating objects in the argument objects' regions or in regions reachable from the argument objects' regions. In another implementation, regions are also passed to methods that analysis identifies as potentially deallocating one or more argument regions or one or more regions reachable from the argument objects' regions.

In one implementation, a globally-maintained shape graph is considered for all method calls. In another, sub-graphs of the global shape graph are associated with regions, as illustrated in FIG. 2, so that only the necessary parts of the shape graph are consulted before a method call.

5. Computing Environment

The above described compiler 100 and executing computer 130 (FIG. 1) can be implemented on any of a variety of computing devices and environments, including computers of various form factors (personal, workstation, server, handheld, laptop, tablet, or other mobile), distributed computing networks, and Web services, as a few general examples. The compiler 100 and runtime environment 260 can be implemented in hardware circuitry, as well as in compiling or runtime software executing within a computer or other computing environment, such as shown in FIG. 9.

Figure 9:
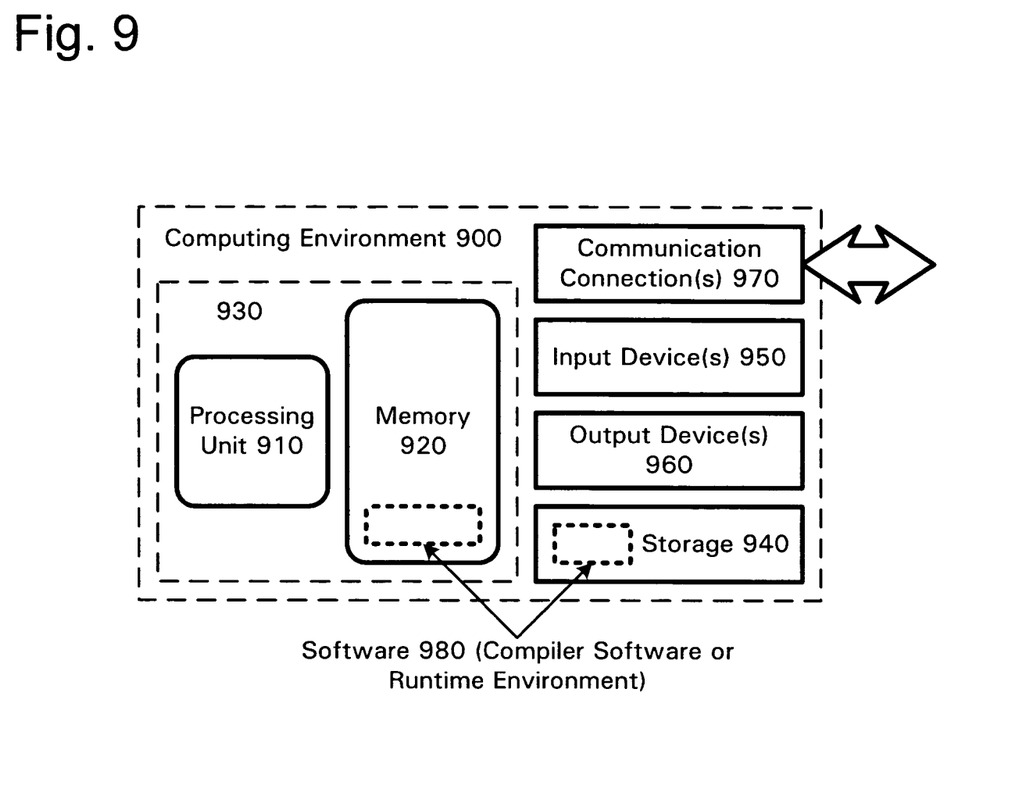
FIG. 9 is a block diagram of a suitable computing environment for implementing the region-based memory management system of FIG. 1.

FIG. 9 illustrates a generalized example of a suitable computing environment 900 in which the described techniques can be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. In one implementation, the memory 920 stores software 980 implementing the compiler 100 or the runtime environment 260.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. In one implementation, the storage 940 stores instructions for the compiling and runtime software.

The input device(s) 950 (e.g., for devices operating as a control point in the device connectivity architecture 100) may be a touch input device such as a keyboard, mouse, pen, or trackball, a voice input device, a scanning device, or another device that provides input to the computing environment 900. For audio, the input device(s) 950 may be a sound card or similar device that accepts audio input in analog or digital form, or a CD-ROM reader that provides audio samples to the computing environment. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The region-based memory management techniques herein can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "create," and "analyze" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method for compiling an object-oriented program, the program executed in a system employing region-based memory management and the method comprising:
receiving source code for an object-oriented program;
performing a points-to analysis on the source code to develop at least one shape graph for the program;
adding instrumentation to the program, the instrumentation configured:
to cause objects to be created in regions based on information in the shape graph and
to cause deletion of all objects in a region when a determination is made that no objects in the region are referenced by any fields outside the region;

compiling the program to produce executable code for the program; and storing the executable code in a computer-readable storage medium;

wherein performing a points-to analysis comprises:

creating alias sets for parameters based on statements contained in the methods of the object-oriented program;

unifying the alias sets based on statements contained in the methods of the program;

creating at least one shape graph with nodes defined by alias sets and edges defined by field mappings between alias sets; and associating the nodes of the shape graph with potential memory regions.

2. A method for compiling an object-oriented program, the program executed in a system employing region-based memory management and the method comprising:

receiving source code for an object-oriented program;

performing a points-to analysis on the source code to develop at least one shape graph for the program;

adding instrumentation to the program, the instrumentation configured:

to cause objects to be created in regions based on information in the shape graph; and to cause deletion of all objects in a region when a determination is made that no objects in the region are referenced by any fields outside the region;

compiling the program to produce executable code for the program; and storing the executable code in a computer-readable storage medium;

wherein the added instrumentation at least in part comprises:

region-creation code which creates a region given a shape graph;

object-allocation code which, given a region and object information, allocates an object within certain region; and region-lookup code which, given a region and an identifier of a field, identifies the region referenced by that field.

3. The method of claim 2, wherein the added instrumentation further comprises field-setting code which, given two regions and a reference to a field from an object in one region which references an object in the other region, sets the shape graph to connect the nodes corresponding to the two regions through an edge corresponding to the field.

4. The method of claim 2, wherein employing region-based memory management comprises at least in part:

keeping a count for each region or set of regions of the number of references made to the objects contained in that region or set; and upon determining that the count for a region or set of regions is zero, deleting the region or set; and wherein the added instrumentation further comprises:

incrementing code which, given a region or set of regions, increases the count kept for that region or set; and decrementing code which, given a region or set of regions, decreases the count kept for that region or set.

5. A computer-readable storage medium containing instructions executed to cause a computer to compile an object-oriented program executed in a system employing region-based memory management by performing the following process:

receiving source code for an object-oriented program;

performing a-points-to analysis on the source code to develop at least one shape graph template for the program;

adding instrumentation to the program, the instrumentation configured:

to cause objects to be created in regions based on the shape graph template; and to cause deletion of all objects in a region when a determination is made that no objects in the region are referenced by any objects outside the region; and compiling the program;

wherein performing a points-to analysis comprises:

creating alias sets for parameters based on statements contained in the methods of the object-oriented program;

unifying the alias sets based on statements contained in the methods of the program;

creating at least one shape graph with nodes defined by alias sets and edges defined by field mapping between alias sets; and associating the nodes of the shape graph with potential memory regions.

6. The computer-readable storage medium of claim 5, wherein the added instrumentation at least in part comprises: region-creation code which creates a region given a shape graph; object-allocation code which given a region and object information, allocates an object within certain region; and region-lookup code which, given a region and an identifier of a field, identifies the region referenced by that field.

7. The method of claim 6, wherein the added instrumentation further comprises field-setting code which given two regions and a reference to a field from an object in one region which references an object in the other region, sets the shape graph to connect the nodes corresponding to the two regions through an edge corresponding to the field.

8. The method of claim 6, wherein employing region-based memory management comprises at least in part:

keeping a count for each region or set of regions of the number of references made to the objects contained in that region or set; and upon determining that the count for a region or set of regions is zero, deleting the region or set; and wherein the added instrumentation further comprises:

incrementing code which, given a region or set of regions, increases the count kept for that region or set; and decrementing code which, given a region or set of regions, decreases the count kept for that region or set.

9. The method of claim 1, wherein each region has a shape graph associated with it and each shape graph is stored along with the regions it is associated with.

10. The method of claim 2, wherein the region-lookup code operates by:

receiving an identifier of a first region;

receiving an identifier of a field in an object contained in the identified first region which references a target object;

identifying a first node in at least one shape graph which represents the identified first region;

identifying an edge leading from the identified first node which represents the field referencing the target object;

identifying a second node which the identified edge leads to; and identifying a second region represented by the second node as a region containing the target object.

11. The computer-readable medium of claim 5, wherein each region has a shape graph associated with it and each shape graph is stored along with the regions it is associated with.

12. The computer-readable medium of claim 6, wherein the region-lookup code operates by:
  receiving an identifier of a first region;
  receiving an identifier of a field in an object contained in the identified first region which references a target object;
  identifying a first node in at least one shape graph which represents the identified first region;
  identifying an edge leading from the identified first node which represents the field referencing the target object;
  identifying a second node which the identified edge leads to; and
  identifying a second region represented by the second node as a region containing the target object.

* * * * *